United States Patent [19]

Kuchar et al.

[11] Patent Number: 4,597,285

[45] Date of Patent: Jul. 1, 1986

[54] HUMIDITY MONITOR AND METHOD

[75] Inventors: Paul J. Kuchar, Hinsdale; Robert W. Sampson, Arlington Heights; Ronald F. Pacanowski, Hoffman Estates, all of Ill.

[73] Assignee: UOP Inc., Des Plaines, Ill.

[21] Appl. No.: 656,563

[22] Filed: Oct. 1, 1984

Related U.S. Application Data

[63] Continuation of Ser. No. 468,793, Feb. 22, 1983, Pat. No. 4,505,147.

[51] Int. Cl.4 .......... G01N 31/00

[52] U.S. Cl. .......... 73/29; 73/1 G

[58] Field of Search .......... 73/29, 23, 1 G, 30

[56] References Cited

U.S. PATENT DOCUMENTS

| | | | |
|---|---|---|---|
| 3,273,377 | 9/1966 | Testerman et al. | 73/23.1 |
| 3,554,004 | 1/1971 | Rauch et al. | 73/23 |
| 3,665,748 | 5/1972 | Mator | 73/1 G |
| 3,756,068 | 9/1973 | Villarroel et al. | 73/23 |
| 4,150,561 | 4/1979 | Zupanick | 73/23 |

OTHER PUBLICATIONS

NASA TM X-1939, "Sensing Molecular Weights of Gases with a Fluidic Oscillator", M. J. LeRoy, Jr. and S. H. Gorland.

Fossil Energy I&C Briefs, Nov. 1981, vol. 2, No. 6, "Fluidic Oscillator Sensors" by Trevor Sutton.

Instruments and Control Systems, Jan. 1971, pp. 81–82, "Molecular Weight Sensor", by M. J. Leroy, Jr. and S. H. Gorland.

NASA TM X-52780, "Evaluation of a Fluidic Oscillator as a Molecular-Weight Sensor of Gases", M. J. LeRoy, Jr. and S. H. Gorland.

Ind. Eng. Chem. Fundam., vol. 11, No. 3, 1972, pp. 407–409, "A Fluidic-Electronic Hybrid System for Measuring the Composition of Binary Mixtures", C. Anderson et al.

NASA TM X-1269, "Use of Fluidic Oscillator as Humidity Sensor for a Hydrogen Steam Mixture", by P. R. Prokopius.

NASA TM X-3068, "Use of Fluidic Oscillators to Measure Fuel-Air Ratios of Combustion Gases", by S. M. Riddlebaugh.

NASA Report No. LO341, 4-16-76, "Fluidic Hydrogen Detector Production Prototype Devel.", G. W. Roe and R. E. Wright, (Sec. 4 and 5 and Append. have been omitted).

*Primary Examiner*—Stephen A. Kreitman

*Attorney, Agent, or Firm*—Thomas K. McBride; John F. Spears, Jr.; Richard J. Cordovano

[57] ABSTRACT

Methods and apparatus for determining water content of gases and vapors. The primary sensing device is a fluidic oscillator through which a sample of gas is passed. It is primarily useful in systems where the moisture content is large and there is a small difference between the molecular weight of water and the average molecular weight of the other components of the gas (or vapor) or systems where there is a large difference between the molecular weight of water and the average molecular weight of the other components.

9 Claims, 3 Drawing Figures

HUMIDITY MONITOR AND METHOD

CROSS REFERENCE TO RELATED APPLICATION

This is is a continuation application of pending application Ser. No. 468,793 filed on Feb. 22, 1983 now U.S. Pat. No. 4,505,147.

BACKGROUND OF THE INVENTION

This invention relates to determination of humidity, or moisture content, of a gas or vaporized liquid. It is primarily useful for analyzing gases where the moisture content is large and there is a small difference between the molecular weight of water and the average molecular weight of the other components of the gas or where there is a large difference between the molecular weight of water and the average molecular weight of the other components.

There are a variety of methods for measuring water content, each of which involves at least one significant disadvantage which disqualifies it for use in certain applications. Thus the choice of a method must be made in light of the application. A survey of methods and apparatus can be found in *Process Instruments and Controls Handbook,* edited by Considine, 2nd ed., McGraw-Hill, 1974, p. 10-3 and following. The applications for which the instant invention is suited will become apparent upon reading this specification, as will the gap in the area of humidity measurement which is filled by the instant invention.

STATEMENT OF ART

LeRoy and Gorland have explored the use of a fluidic oscillator as a molecular weight sensor of gases and reported their work in an article entitled "Molecular Weight Sensor" published in *Instruments and Control Systems* of January, 1971, and in National Aeronautics and Space Administration Technical Memorandum TMX-52780 (circa 1970) and TMX-1939 (January 1970). In *Fossil Energy I & C Briefs,* Nov. 1981, prepared for the U.S. Dept. of Energy by Jet Propulsion Laboratory of California Institute of Technology, Sutton of The Garrett Corp., referred to the use of a fluidic oscillator to measure gas compositions. The use of a fluidic oscillator in measuring composition in a methanol-water system is discussed in an article on page 407 of *Ind. Eng. Chem. Fundam.,* Vol. 11, No. 3, 1972. U.S. Pat. No. 3,273,377 (Testerman) shows the use of two fluidic oscillators in analyzing fluid streams. A fluidic device for measuring the ratio by volume of two known gases is disclosed in U.S. Pat. No. 3,554,004 (Rauch et al.). In U.S. Pat. No. 4,150,561, Zupanick claims a method of determining the constituent gas proportions of a gas mixture which utilizes a fluidic oscillator.

In National Aeronautics and Space Administration Technical Memorandum TMX-1269 (August 1966), Prokopius reports on the use of a fluidic oscillator in a humidity sensor developed for studying a hydrogen-oxygen fuel cell system. In NASA TMX-3068 (June 1974), Riddlebaugh describes investigations into the use of a fluidic oscillator in measuring fuel-air ratios in hydrocarbon combustion processes. NASA Report No. L0341 (Apr. 16, 1976), written by Roe and Wright of McDonnell Douglas under Contract No. NAS 10-8764 at the Kennedy Space Center, reports on work done to develop a fluidic oscillator as a detector for hydrogen leaks from liquid hydrogen transfer systems. U.S. Pat. No. 3,756,068 (Villarroel et al.) deals with a device using two fluidic oscillators to determine the percent concentration of a particular gas relative to a carrier gas.

BRIEF SUMMARY OF THE INVENTION

It is an object of this invention to provide methods and apparatus for determining water content of gases and vaporized liquids, which are capable of use both in the laboratory and the field. Also, it is an object that such apparatus be relatively inexpensive, have a minimum of moving mechanical parts, and be compact, so as to facilitate transportation and installation. It is a further object of this invention that such methods and apparatus have high accuracy and reliability while providing results essentially instantaneously. In one of its broad embodiments, the invention comprises (a) a first fluidic oscillator and a second fluidic oscillator; (b) means for establishing flow of a sample through said oscillators; (c) means for adjusting water content of at least a portion of the sample before it passes through said second oscillator; (d) means for controlling the pressures at which the sample passes through said oscillators; (e) means for measuring sample temperatures at said oscillators and transmitting signals representative of the temperatures; (f) means for measuring the frequencies of oscillation at said oscillators and transmitting signals representative of the frequencies; (g) computing means for calculating the moisture content of the sample using equations and data stored in said computing means and using data supplied by said means for providing temperature and frequency signals; and, (h) means for communicating information contained in said computing means. This apparatus may be further characterized in that said oscillators are arranged in series, so that the sample flows initially through said first oscillator and then through said second oscillator, and in that said means for adjusting water content act upon the sample before it passes through said second oscillator but after it passes through said first oscillator. Alternatively, this apparatus may be further characterized in that said oscillators are arranged in parallel, such that a first portion of the sample passes through said first oscillator and a second portion of the sample passes through said second oscillator, and in that said means for adjusting water content act only upon the second portion.

In another broad embodiment, the invention comprises (a) a fluidic oscillator; (b) means for establishing flow of the sample through said oscillator; (c) means for adjusting water content of the sample before it passes through said oscillator; (d) means for periodically bypassing flow of the sample around said water content adjustment means; (e) means for controlling the pressure at which the sample passes through said oscillator; (f) means for measuring the temperature of the sample at said oscillator and transmitting a signal representative of the temperature; (g) means for measuring the frequency of oscillation at said oscillator and transmitting a signal representative of the frequency; (h) computing means for controlling said bypassing means and calculating the moisture content of the sample using equations and data stored in said computing means and using data supplied by said means for providing temperature and frequency signals; and, (i) means for communicating information contained in said computing means.

When the invention is to be used to monitor gas continuously flowing in a pipeline, it further comprises a flow loop which is comprised of an inlet connection and an outlet connection communicating by means of a first conduit, wherein the inlet and outlet connections are connected to a process pipeline so that process fluid can flow continuously through the flow loop, and further comprises a second conduit through which the sample can flow continuously from the flow loop to the apparatus described above.

DETAILED DESCRIPTION OF THE INVENTION

A device known as a fluidic oscillator is used in this invention. This is one of a class of devices which are utilized in the field of fluidics. A fluidic oscillator may have any of a number of different configurations in addition to that depicted in FIG. 1. The publications mentioned under the heading "Statement of Art" describe fluidic oscillators and their governing principles in detail and therefore it is unnecessary to present herein more than the following simple description.

Figure 1:
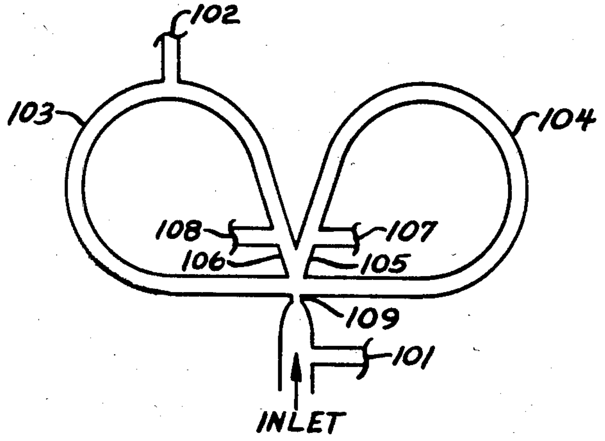
FIG. 1 is a schematic diagram of a fluidic oscillator.

A fluidic oscillator may be described as a set of passageways, in a solid block of material, which are configured in a particular manner. If the passageways are centered in the block and the block is cut in half in the appropriate place, a view of the cut surface would appear as the schematic diagram of FIG. 1. Referring to FIG. 1, a gas stream enters the inlet, flows through nozzle 109, and "attaches" itself to one of two stream attachment walls 105 and 106 in accordance with the principle known as the Coanda effect. Gas flows through either exit passage 107 or exit passage 108, depending on whether the stream is attached to wall 105 or wall 106. Exit passages 107 and 108 can be considered as extending to the outside of the block of material in a direction perpendicular to the plane in which the other passages lie. Consider a gas stream which attaches to wall 105 and flows through exit passage 107. A pressure pulse is produced that passes through delay line 104. The pressure pulse impinges on the gas stream at the outlet of nozzle 109, forcing it to "attach" to wall 106 and flow through exit passage 108. A pulse passing through delay line 103 then causes the stream to switch back to wall 105. It is in this manner that an oscillation is established. The frequency of the oscillation is a function of the pressure propagation time through the delay line and time lag involved in the stream switching from one attachment wall to the other. For a delay line of given length, the pressure propagation time is a function of the characteristics of the gas, as shown in the above mentioned publications and also by the equations which are presented herein. The frequency of oscillation can be sensed by a pressure sensor or microphone located in one of the passages, such as shown by sensing port 102. A differential sensing device connected to both passages can also be used. Sensing port 101 is shown to indicate one potential location for a temperature sensor.

Figure 2:
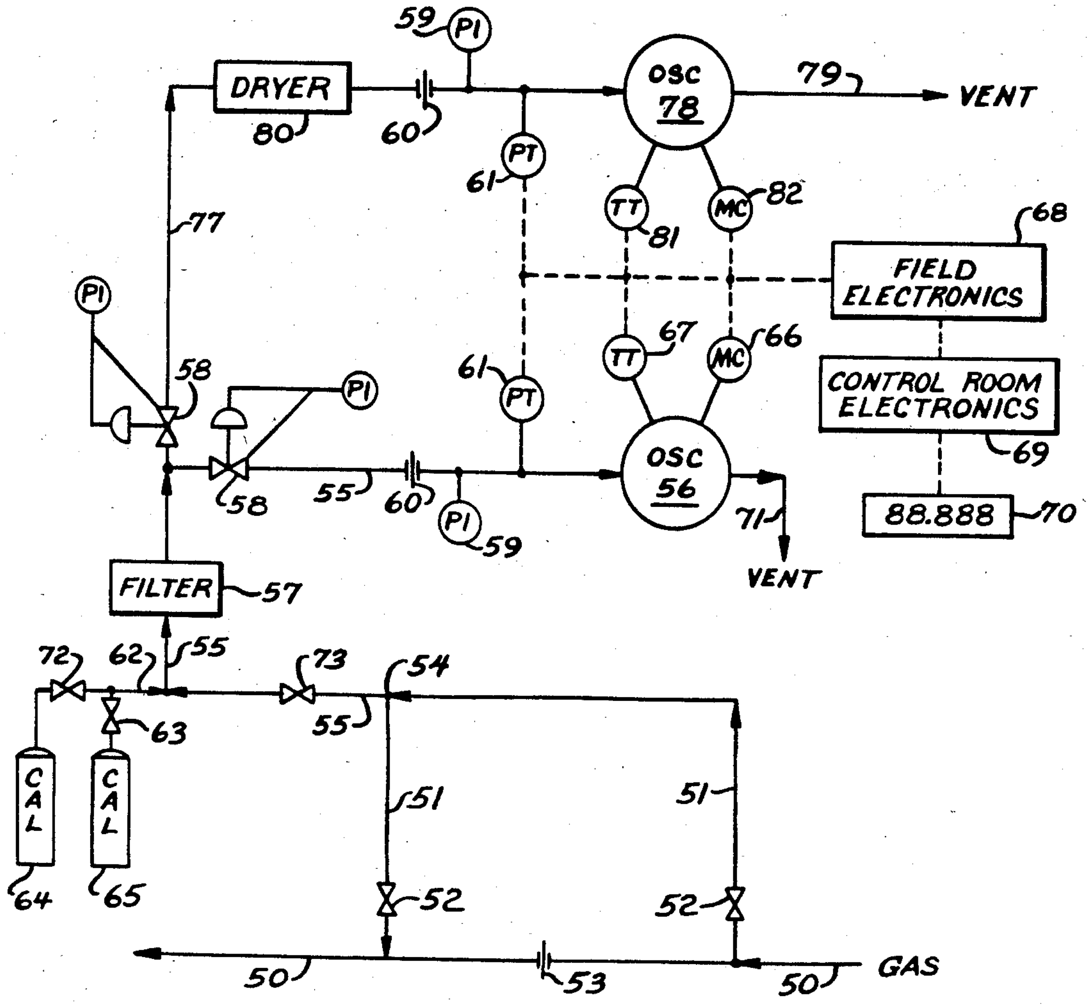
FIG. 2 is a schematic diagram of an embodiment of the invention comprising a humidity monitor using two oscillators in parallel wherein the moisture content of gas flowing in a pipeline is measured on a continuous basis and displayed in a remote location.
Figure 3:
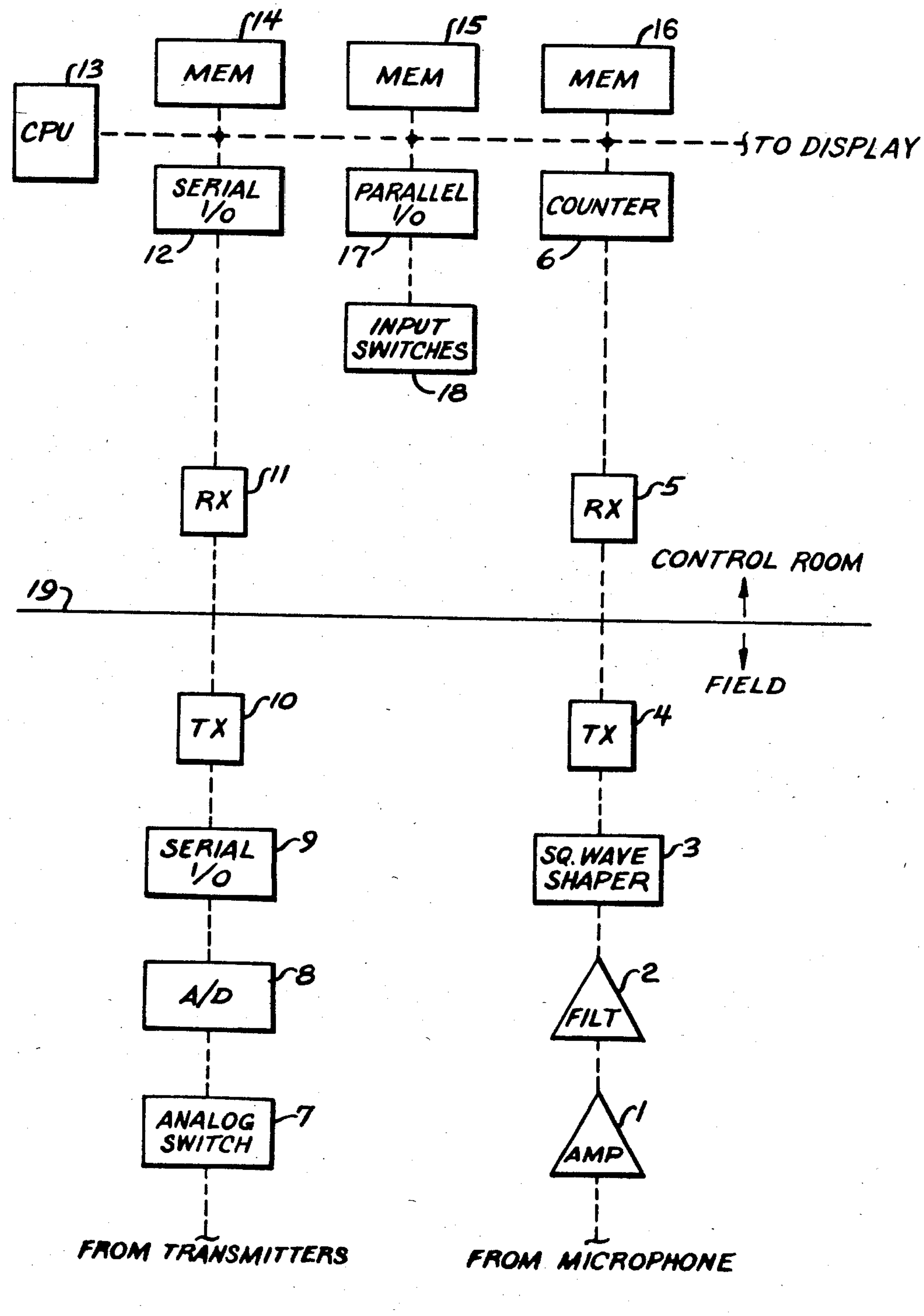
FIG. 3 is an expansion, in block diagram form, of portions of FIG. 2 labeled electronics.

The invention can be most easily described by initial reference to FIGS. 2 and 3, which represent a particular embodiment of the invention. Referring to FIG. 2, gas is flowing through pipeline 50. A sample flow loop 51 is formed by means of conduit, such as ¾-inch diameter pipe, connected to pipeline 50 upstream and downstream of pressure drop element 53. The purpose of pressure drop element 53 is to cause a loss of pressure in pipeline 50 which is the same as the pressure drop in flow loop 51 when a sufficient amount of gas is passing through flow loop 51. Gas flow through flow loop 51 is sufficient when gas composition at sample point 54 is substantially the same as that in pipeline 50 at any given instant. Normally pressure drop element 53 is a device present in the pipeline for a primary purpose unrelated to taking a sample, for example, a control valve. A sufficient length of pipeline 50 can serve as pressure drop element 53 or an orifice plate can be installed in pipeline 50 to serve the purpose. Valves 52 are used to isolate flow loop 51 from pipeline 50.

Sample line 55 carries a sample of gas from sample point 54 to fluidic oscillator 56. Sample line 77 branches off to supply a sample of gas to fluidic oscillator 78. Filter 57 is provided to remove particles which might be present in the sample, so that the narrow passages of fluidic oscillators 56 and 78 or other flow paths will not become plugged. Pressure regulators 58, of the self-contained type with an integral gauge, are provided so that gas flowing through oscillator 56 and that flowing through oscillator 78 is at a substantially constant pressure. The frequency of oscillation at the oscillators may vary with pressure, depending on the particular oscillators used and the actual pressure at the oscillators. As will be seen, frequencies are correlated with humidity, so variation for any other reason is unacceptable. Any pressure regulating means capable of maintaining flow through the oscillators at a substantially constant value may be used. Under certain circumstances, sufficient pressure regulation will exist by virtue of system configuration and pressure level, so that no separate pressure regulation device is needed.

Orifices 60 are provided for the purpose, in conjunction with pressure regulators 58, of maintaining a constant flow of gas through each oscillator. Pressure gauges 59 indicate the pressures downstream of orifices 60. Normally it is not necessary to install orifices 60, as the sample lines or the inlet ports of the oscillators serve the same purpose. Conduits 71 and 79 carry the samples away from oscillators 56 and 78, to the atmosphere in a location where discharge of the gas will cause no harm or to a process vessel where it can be utilized. However, the quantity of gas is sufficiently small that it may not be economical to do more than discharge it to the atmosphere. Pressure transmitters 61 are switch devices which provide signals for actuation of alarms if the pressures do not remain in previously established ranges. Thus communication that inaccurate results may be obtained is accomplished. Dryer 80 is provided to remove substantially all water from the gas which passes through oscillator 78. There are many commercially available devices to accomplish this. A typical device contains two beds of a desiccant material so that gas to be desiccated passes through one bed while the other bed is being regenerated by applied heat.

Obtaining a representative sample stream from a pipeline, providing it to the inlet port of a fluidic oscillator, removing it from the outlet port of the oscillator, and maintaining a substantially constant pressure drop across the oscillator can be accomplished by a variety of different means and methods for each given set of conditions, such as desired flow rate through the oscillator and pipeline pressure. These means and methods, which can be applied as alternatives to those shown in FIG. 2, are well known to those skilled in the art.

A fluidic oscillator can be designed and fabricated upon reference to the literature, such as that mentioned under the heading "Statement of Art" or may be purchased. In test work applicable to this invention, an oscillator supplied by Garrett Pneumatic Systems Division of Phoenix, Ariz. was used. This oscillator is of a different configuration than that shown in FIG. 1 in that the "loops" formed by delay lines 103 and 104 are open such that the "loops" define cavities and in that there is only one exit passage. Drawings of this configuration can be found in the cited references. The flow rate through this oscillator when testing natural gas is approximately 250 $cm^3$/min when upstream pressure is approximately 20 psig and the oscillator is vented directly to atmosphere. A flow rate range of 200 to 500 $cm^3$/min is considered to be reasonable for commercial use and sufficient to provide acceptable humidity results.

Temperature transmitters 67 and 81 provide the temperature of the gas at each oscillator. Any of the well known means of sensing temperature may be used, such as a thermister, thermocouple, or solid state semiconductor sensor. The sensor may be located in a passage of the oscillator, such as shown in FIG. 1 (sensing port 101), or in the sample line or conduit adjacent to the oscillator. Microphones 66 and 82 sense the frequency of oscillation at each oscillator. A microphone is located in a position to sense when the gas stream attaches itself to one of the walls, such as the position shown in FIG. 1 (sensing port 102). There are a wide variety of sensors which can be used, for example, a piezoceramic transducer, in which pressure induces a voltage change, or a piezo-resistance transducer, in which pressure induces a resistance change. Used in test work applicable to this invention was a Series EA 1934 microphone supplied by Knowles Electronics of Franklin Park, Ill.

Signals from microphones 66 and 82, temperature transmitters 67 and 81, and pressure transmitters 61 are processed by equipment denoted field electronics 68 and control room electronics 69. Field electronics are located adjacent to the oscillators while control room electronics are in a central control room some distance away from the oscillators. This equipment processes the signals to obtain humidities of the gas and performs other functions which will be described herein. Display unit 70 receives signals from control room electronics 69 and communicates humidities of the sample gas and other information in human-readable form. It may be, for example, a liquid crystal display. The information may be communicated to other equipment, such as a strip chart recorder for making a permanent record or a computer for further manipulation.

Two containers of calibration gas, 64 and 65, are provided to check that the monitor is operating properly. Normally one of the calibration gases has a humidity in the lower part of the range of values expected of the gas flowing in pipeline 50 and one has a humidity in the higher part of that range. By manipulating valves 63, 72 and 73, the calibration gases are allowed to flow, in turn, through calibration conduit 62 and sample line 55 to oscillator 56. The monitor may be arranged so that humidities of the calibration gases are displayed and a human technician must, if necessary, adjust the monitor to the known calibration gas humidity values, or may be arranged so that the monitor is capable of adjusting itself. For example, the monitor could re-calculate the values of constants stored in it which are used in calculating sample humidities. Periodic calibration must be accomplished to check for malfunctions and changes which might take place in the apparatus such as electronic drift, corrosion, and substances accumulating in the apparatus.

Partial calibrations, or operation checks, can be accomplished in a number of different ways. Use of a calibration gas can be combined with operation checks accomplished electronically. A totally electronic operational check can be made. For example, means for generating appropriate oscillating tones can be provided at microphones 66 and 82 so that new values of $K_1$ and $K_2$ can be calculated. Of course, this procedure checks only the electronics and not the oscillator. In another simple check, tuning forks are used to generate tones at microphones 66 and 82 and the synthetic "humidity" resulting from the tone inputs is compared to the expected proper value in computing means. Operational checks can be performed by switching flow from one oscillator to the other. Temperature changes can be used to perform operational checks. This can be done by using heating means, such as electrical resistance coils, to heat gas flowing into the oscillators and comparing moisture contents of heated and unheated gas. If the gas used in the check is from a changing process source, provision must be made to prevent changes during the checking period. This can be accomplished by providing a container to collect a sufficient quantity of gas to do the check or recycling gas from the outlet of the oscillators back through the system. Given a particular objective to be accomplished, other checks will become apparent.

An assembly of electronics devices for processing signals from the transmitters and microphones (variables) and providing signals to the display unit can be fabricated from standard components by one skilled in the art. FIG. 3 shows one such design in simplified form. Line 19 indicates which items are located in the field and which are located in the control room. For ease of understanding, FIG. 3 is drawn as if there is only one oscillator instead of two. It can easily be seen that certain items need to be duplicated so data relating to both oscillators can be provided to the computing means. Though the following description mentions only oscillator 56 and associated items, operation of oscillator 78 and associated items is the same as for oscillator 56. A signal from microphone 66 is provided to amplifier 1, passed through filter 2, and converted to a square wave pulse in square wave shaper 3. The output of square wave shaper 3 is provided to counter 6 by means of transmitter 4 and receiver 5. Counter 6 counts the number of cycles occurring in oscillator 56 in a unit of time, thus generating frequency information. The signals from pressure transmitter 61 and temperature transmitter 67 are selected one at a time by analog switching device 7 and sent sequentially to analog-to-digital converter 8, where they are converted to digital form. Serial input/output device 9 converts the output of analog-to-digital converter 8 to a serial pulse train, which is provided by means of transmitter 10 and receiver 11 to serial input/output device 12, located in the control room.

Memory device 15, a random access memory chip (RAM), is used to store the variables. A program for control of the electronics devices and performing computations is stored in memory device 14, a programmable read-only memory chip (PROM). Constants needed for the computation are stored in memory device 16, an electronically erasable programmable read-only memory chip (EEPROM). Central processing unit 13 performs the necessary computations and provides output signals to display unit 70. Input switches 18 are used to provide human input to the electronic components. These are rotary click-stop switches which can be set to any digit from 0 to 9. One of the switches is the mode switch and the others are used to enter numerical values. The position of the mode switch "instructs" the apparatus what to do. In the calculate mode, the apparatus displays the humidity of a sample. When the mode switch is placed in the "constant load" position, numerical values of constants can be manually set on the other switches and loaded into the system by depressing a button. Another position of the mode switch allows values of variables to be displayed in sequence on display 70. When it is desired to calibrate the apparatus, still other positions are used. Additional positions are used as required. Parallel input/output device 17 provides a means of transmitting information from input switches 18 and also controlling counter 6. It will be clear to one skilled in the art that certain of the electronics devices may be collectively referred to as a computer or computing means or may be contained within a computer or computing means.

The basic equation used in the practice of this invention which describes the operation of a fluidic oscillator is $$M = \frac{K_1 G T}{F^2} + K_2, \text{ where}$$

M=molecular weight of the gas flowing through oscillator,
G=specific heat ratio of the gas flowing through oscillator,
T=temperature of the gas flowing through oscillator,
F=frequency of oscillator output signal, and
$K_1$ and $K_2$=constants.

The quantity G can be provided as a constant stored in computer memory or can be calculated by means of a correlation, such as the equation $$G = K_3 + K_4 M + K_5 M^2 + K_6 M^3,$$

where $K_3$, $K_4$, $K_5$ and $K_6$ are constants.

The computer is programmed to solve these equations for each oscillator, using values of F and T provided as described above, and values of constants which exist in computer memory. It can be readily seen that these molecular weights can be used to obtain the moisture content of the sample by means of the equations $$M_s = X_w M_w + X_b M_b \text{ and } X_w + X_b = 1,$$

where
X=weight fraction,
$X_w$=X of water present in the sample,
$X_b$=X of all components of the sample other than water,
$M_s$=M of the sample before water content adjustment,
$M_b$=M of the sample components other than water (average), and
$M_w$=M of water.

$M_s$ is calculated by means of the basic equation applied to data from oscillator 56 and $M_b$ is derived from data from oscillator 78 in the same manner. Thus there are two equations and two unknowns, so $X_w$ can be calculated in the computer.

An approach to developing a basic oscillator equation on a theoretical basis is as follows. Reference is made to FIG. 1 as an example. A pressure pulse which passes through delay line 103 or 104, described above, travels at the local speed of sound, u. Denoting the length of each delay line as L, the time required for the pulse to traverse a delay line is L/u. The time for a complete cycle of oscillation includes that required for a pulse to travel through each delay line. An equation for the local speed of sound is $$u = \left(\frac{GgRT}{M}\right)^{\frac{1}{2}},$$

where
u=speed of sound,
g=gravitational constant, and
R=universal gas constant.

Thus the time required for the pulse to traverse the two delay lines is 2 L/u or $$2L/\left(\frac{GgRT}{M}\right)^{\frac{1}{2}}.$$

As explained above, the total time for a cycle of oscillation also depends on switching time, the time required for switching of the stream from one attachment wall to another, or the period between arrival of a pulse propagated through a delay line at nozzle 109 and the start of a pulse through the other delay line. Switching time can be expressed as inversely proportional to u, that is as $$\text{constant}/\left(\frac{GgRT}{M}\right)^{\frac{1}{2}}.$$

Since L is a constant for any given oscillator and the inverse of time is frequency, the following equation can be written $$F = \left(\frac{GgRT}{M}\right)^{\frac{1}{2}}/\text{constant} + \left(\frac{GgRT}{M}\right)^{\frac{1}{2}}/2L.$$

Solving the equation for M and making g, L, and R a part of the constant, the equation becomes $$M = \frac{\text{constant} \times GT}{F^2}.$$

If the above constant is designated as $K_1$, and $K_2$ is added to the right-hand side, the basic equation presented above is obtained. It has been found necessary to add the constant $K_2$ to the equation in order to accurately describe the oscillator. It is not possible to use a purely theoretical equation, in part as a result of the imperfections of hardware and measuring equipment. For example, no two fluidic oscillators will perform in an identical manner. In a particular oscillator, which was used in a natural gas application, $K_1$ and $K_2$ were empirically established by flowing gases such as methane, ethane, propane, butane, and pentane through the monitor. The values of $K_1$ and $K_2$ thus established were $7.538 \times 10^6$ and 1.58, respectively. This calibration procedure must be followed for each monitor which is fabricated, using gases similar to the gas for which the monitor is to be used. However, only two calibration gases are required to define $K_1$ and $K_2$.

An equation for G can be developed by a standard curve-fitting method using values of G available in the literature for appropriate gases. As can be appreciated by those skilled in the art, there are other ways to develop and express G and to store it in the computer.

An alternative to the use of dryer 80 is to use apparatus to saturate the sample portion passing through oscillator 78. This apparatus is readily available. For example, saturating apparatus may comprise a small chamber into which a fine spray of water is introduced through a nozzle. After gas passes through this saturating chamber, it is passed through another chamber for removal of any water droplets which might exist in the stream. The equations used in practicing this embodiment of the invention are similar to those presented above. An example is as follows. For the oscillator through which sample is flowing before adjustment of water content $$M_s = X_w M_w + X_b M_b \text{ and } X_w + X_b = 1.$$

For the oscillator through which saturated sample is flowing $$M_a = X_{aw} M_w + X_{ab} M_b \text{ and } X_{aw} + X_{ab} = 1.$$

Previously undefined terms are $M_a$ = M of sample after saturation, $X_{aw}$ = X of water in sample after saturation, $X_{ab}$ = X of all components of the sample other than water after saturation.

It can be seen that there are five unknowns and only four equations, so that it is necessary to know one more quantity when practicing this embodiment of the invention than when using drying apparatus as described above. However, this information is often available. Equations for other cases can easily be written.

FIG. 2 shows an embodiment of the invention when a continuous flow of sample through the oscillators is established in order to obtain a continuous humidity value for gas flowing in a pipeline. An embodiment of the invention for use in a laboratory would not require the sample loop shown in FIG. 2. Sample could be collected in an evacuated pressure-resistant container, commonly called a sample bomb, which is then connected to sample line 55. In applications where the moisture contents of liquids are to be determined, a means for vaporizing the liquids is required. This can be accomplished, for example, by use of electric resistance heating elements surrounding a portion of the conduit through which the sample passes. The term "gas" is frequently used herein; it should be understood to include vapors resulting from substances which are initially in liquid form.

In the parallel flow arrangement shown in FIG. 2, the sample is split into two portions and each portion is passed through a different oscillator. The water content of one of the portions is adjusted before passage through the oscillator and the humidity of the sample is calculated by reference to differences in signals obtained from the transmitters associated with each oscillator. An alternate flow arrangement involves series flow, where the entire sample is passed through one oscillator and then through another. The means for moisture adjustment is located such that the sample passes through the first oscillator, has its moisture content adjusted, and then passes through the second oscillator. This can easily be visualized by altering FIG. 2 so that sample line 77 connects to vent line 71 instead of sample line 55; thus the flow sequence would be oscillator 56 to dryer 80 to oscillator 78. In this embodiment of the invention, the moisture content of the sample is calculated in the same manner, that is, by reference to the differences at each oscillator. However, it should be noted that when a continuous flow of sample is provided, a rapidly changing sample humidity could result in inaccuracies, since there is a time lag between measurement of a "particle" of sample in the first oscillator and measurement of the same moisture-adjusted "particle" in the second oscillator. Compensation for this time lag can easily be accomplished in the electronics portion of a monitor to remove any inaccuracy. One of the methods of compensating involves simply placing the same time lag in the signal path associated with the appropriate oscillator just before the signal differences are noted.

In another embodiment of the invention, only one oscillator is used. Means for adjusting the water content of the sample are provided along with means for periodically bypassing the sample flow around the water content adjustment means. For example, if a dryer is used, the stream continuously passing through the oscillator alternately contains water and does not contain water. This can be easily visualized by altering FIG. 2 to eliminate the sample line branch for oscillator 56, placing a three-way valve in sample line 77 just ahead of dryer 80, and placing a length of conduit between the valve and sample line 77 just downstream of dryer 80; then the three-way valve is periodically cycled to route sample flow "around" dryer 80. The moisture content of the sample is calculated by reference to differences in signals received from the transmitters associated with the oscillator for each condition, that is, when dried sample is flowing and when non-dried sample is flowing. The same time lag problem as noted above exists when the sample humidity is rapidly changing. Compensation can be accomplished in the same manner.

The use of the examples set forth herein are not intended as a limitation on the broad scope of the invention as set forth in the claims. It is also intended that further applications of the principles of the invention as would normally occur to one skilled in the art to which the invention relates be included within the claims. Mixtures of gases not including water can be analyzed by applications of the principles of this invention.

We claim as our invention:

1. A method for determining the moisture content of a sample of gas comprising the steps of:

(a) passing the sample of gas having an unknown moisture content through a fluidic oscillator at a controlled pressure;

(b) measuring the temperature of the sample at said oscillator and transmitting a signal representative of said measured temperature;

(c) measuring the frequency of oscillation of said oscillator and transmitting a signal representative of said measured frequency;

(d) adjusting the moisture content of said subsequent to steps (b) and (c) to provide a second gas sample having a known moisture content which differs from that of the sample passed through the fluidic oscillator is step (a);

(e) passing said second gas sample through said fluidic oscillator at a controlled pressure;

(f) repeating steps (b) and (c) for said second gas sample; and (g) calculating the moisture content of said gas sample passing through said fluidic oscillator in step (a) by reference to the differences in signals transmitted in connection with the measurement of the respective temperatures of the samples and the frequencies of oscillation in steps (b), (c) and (f).

2. The method of claim 1 wherein the moisture content of said gas sample is adjusted by passing said gas sample through a drying means to decrease the moisture content of said sample.

3. The method of claim 2 wherein substantially all moisture is removed from said gas sample in said drying means.

4. The method of claim 1 wherein the moisture content of said gas sample is adjusted by passing said gas sample through a humidifying means to increase the moisture content of said sample.

5. The method of claim 4 wherein the moisture content of the gas sample is increased by spraying water into said sample.

6. The method of claim 5 wherein water droplets are removed from said sample subsequent to water being sprayed into the sample.

7. The method of claim 4 wherein said gas sample is caused to be substantially saturated with moisture in said humidifying means.

8. The method of claim 1 wherein the moisture content of said gas sample is adjusted by periodically passing the gas sample through means to adjust the moisture content of the gas.

9. The method of claim 1 wherein the moisture content of said gas sample is calculated in computing means using equations and data stored in said computing means and said measurements transmitted during steps (b), (c) and (f).

* * * * *

UNITED STATES PATENT AND TRADEMARK OFFICE

CERTIFICATE OF CORRECTION

PATENT NO. : 4,597,285

DATED : July 1, 1986

INVENTOR(S) : Kuchar et al.

It is certified that error appears in the above-identified patent and that said Letters Patent is hereby corrected as shown below:

In Column 10, line 61: Change "of" (second occurrence) to --at--;

line 64: After "said", insert --sample--;

line 68: Change "is" to --in--.

Signed and Sealed this

*Thirtieth* Day of *September 1986*

[SEAL]

*Attest:*

DONALD J. QUIGG

*Attesting Officer* *Commissioner of Patents and Trademarks*